US012626869B2

(12) United States Patent
Yamada et al.

(10) Patent No.: US 12,626,869 B2
(45) Date of Patent: May 12, 2026

(54) SOLID ELECTROLYTIC CAPACITOR

(71) Applicant: Panasonic Intellectual Property Management Co., Ltd., Osaka (JP)

(72) Inventors: Yuichiro Yamada, Osaka (JP); Katsuhiro Ogasawara, Kyoto (JP); Atsushi Tanaka, Osaka (JP); Masahiro Sato, Kyoto (JP); Tomoki Sugimoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 18/041,236

(22) PCT Filed: Aug. 27, 2021

(86) PCT No.: PCT/JP2021/031468
§ 371 (c)(1),
(2) Date: Feb. 10, 2023

(87) PCT Pub. No.: WO2022/059459
PCT Pub. Date: Mar. 24, 2022

(65) Prior Publication Data
US 2023/0307191 A1 Sep. 28, 2023

(30) Foreign Application Priority Data

Sep. 17, 2020 (JP) ................................. 2020-156129

(51) Int. Cl.
*H01G 9/10* (2006.01)
*H01G 9/15* (2006.01)
*H01G 9/26* (2006.01)
(52) U.S. Cl.
CPC ................. *H01G 9/10* (2013.01); *H01G 9/15* (2013.01); *H01G 9/26* (2013.01)

(58) Field of Classification Search
CPC .. H01G 4/30; H01G 4/15; H01G 4/26; H01G 4/32
See application file for complete search history.

(56) References Cited

U.S. PATENT DOCUMENTS

2002/0001169 A1* 1/2002 Shiraishi .................. H01G 9/26
361/523
2003/0174462 A1* 9/2003 Wada ..................... H01G 9/012
361/533

(Continued)

FOREIGN PATENT DOCUMENTS

JP       2003-272950       9/2003
JP       2004-203911       7/2004

(Continued)

OTHER PUBLICATIONS

International Search Report of PCT application No. PCT/JP2021/031468 dated Nov. 9, 2021.

*Primary Examiner* — Michael P McFadden
(74) *Attorney, Agent, or Firm* — Rimon P.C.

(57) ABSTRACT

A solid electrolytic capacitor includes an element stack, an anode terminal, a cathode terminal, and an exterior member. The element stack includes a plurality of capacitor elements stacked on each other, and a conductive material interposed between two adjacent capacitor elements in the plurality of capacitor elements. Each of the plurality of capacitor elements includes an anode part and a cathode part, and the conductive material is disposed on the cathode part. The anode terminal is connected to the anode part. The cathode terminal is connected to the cathode part via a conductive paste. The cathode terminal has a facing surface facing a tip end of the element stack with a gap interposed between the facing surface and the tip end, and at least a part of the gap is filled with a sealing material.

18 Claims, 4 Drawing Sheets

(56) References Cited

U.S. PATENT DOCUMENTS

| | | | |
|---|---|---|---|
| 2006/0262486 A1 | 11/2006 | Tadanobu et al. | |
| 2015/0009606 A1* | 1/2015 | Mishima | H01G 9/045 |
| | | | 252/514 |
| 2018/0137987 A1* | 5/2018 | Vilc | H01G 9/10 |
| 2020/0194187 A1 | 6/2020 | Kumakawa et al. | |
| 2022/0102081 A1* | 3/2022 | Hirota | H01G 9/0425 |

FOREIGN PATENT DOCUMENTS

| | | |
|---|---|---|
| JP | 2007-095933 | 4/2007 |
| JP | 2011-091444 | 5/2011 |
| JP | 2020-096066 | 6/2020 |

* cited by examiner

FIG. 2

SOLID ELECTROLYTIC CAPACITOR

CROSS-REFERENCE TO RELATED APPLICATIONS

This application is a U.S. national stage application of the PCT International Application No. PCT/JP2021/031468 filed on Aug. 27, 2021, which claims the benefit of foreign priority of Japanese patent application No. 2020-156129 filed on Sep. 17, 2020, the contents all of which are incorporated herein by reference.

TECHNICAL FIELD

The present disclosure relates to a solid electrolytic capacitor.

BACKGROUND

There has been conventionally known a solid electrolytic capacitor including a plurality of capacitor elements each having a cathode part, a cathode terminal connected to the cathode part via a conductive paste, and an exterior member covering these components (for example, Unexamined Japanese Patent Publication No. 2011-091444). In Unexamined Japanese Patent Publication No. 2011-091444, the equivalent series resistance (ESR) of the solid electrolytic capacitor is reduced by connecting the cathode parts of the plurality of capacitor elements with a conductive film.

SUMMARY

An aspect of the present disclosure relates to a solid electrolytic capacitor. The solid electrolytic capacitor includes an element stack, an anode terminal, a cathode terminal, and an exterior member that covers the element stack, the anode terminal, and the cathode terminal in a state where a part of each of the anode terminal and the cathode terminal is exposed. The element stack includes a plurality of capacitor elements stacked on each other, and a conductive material disposed between two adjacent capacitor elements in the plurality of capacitor elements. Each of the plurality of capacitor elements includes an anode part and a cathode part, and the conductive material is disposed on the cathode part. The anode terminal is connected to the anode part. The cathode terminal is connected to the cathode part via a conductive paste. The cathode terminal has a facing surface facing a tip end of the element stack with a gap between the facing surface and the tip end, and at least a part of the gap is filled with a sealing material.

According to the present disclosure, a solid electrolytic capacitor having high airtightness can be obtained.

BRIEF DESCRIPTION OF THE DRAWINGS

FIG. 2 is a sectional view illustrating a configuration of a capacitor element according to the present disclosure.

DESCRIPTION OF EMBODIMENT

Figure 1:
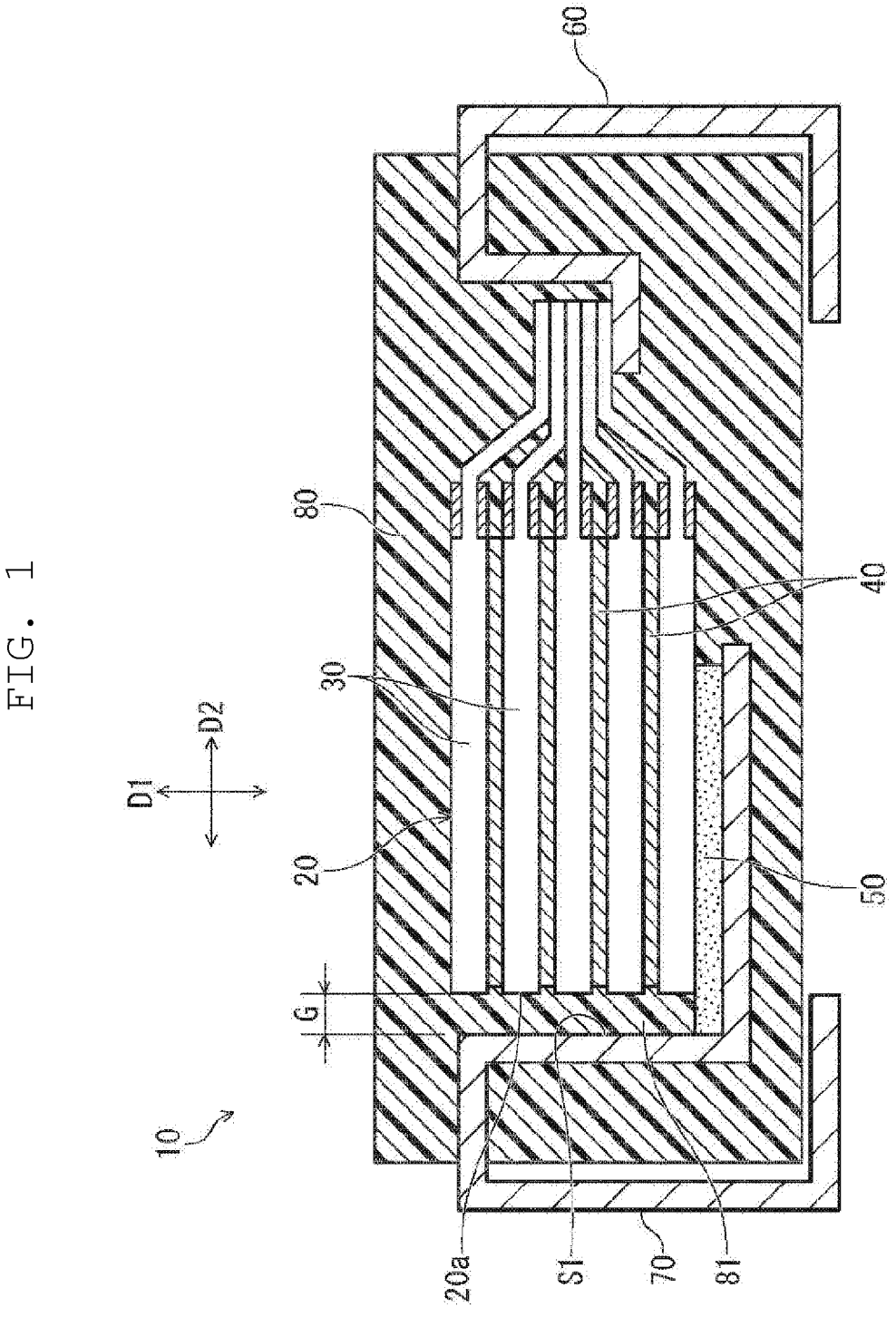
FIG. 1 is a sectional view illustrating a configuration of a solid electrolytic capacitor according to the present disclosure.

Prior to the description of exemplary embodiments, problems in the conventional technology will be briefly described below. Solid electrolytic capacitors desirably have structures having excellent airtightness to avoid deterioration of characteristics of a plurality of capacitor elements. However, improvement in airtightness of structures of solid electrolytic capacitors has not conventionally been sufficiently studied. In such a circumstance, the present disclosure provides a solid electrolytic capacitor having high airtightness.

Hereinafter, an exemplary embodiment of a solid electrolytic capacitor according to the present disclosure will be described by way of examples. The present disclosure is not limited to the examples described below. In the following description, specific numerical values and materials may be exemplified, but other numerical values and materials may be applied as long as the effects of the present disclosure can be obtained.

(Solid Electrolytic Capacitor)

A solid electrolytic capacitor according to the present disclosure includes an element stack, an anode terminal, a cathode terminal, and an exterior member. These will be described below.

(Element Stack)

The element stack includes a plurality of capacitor elements stacked on each other and a conductive material. The plurality of capacitor elements each includes an anode part and a cathode part. The anode parts of the plurality of capacitor elements are overlapped and electrically connected to each other. The plurality of anode parts may be joined to each other by welding, for example.

The conductive material is disposed between the cathode parts of two adjacent capacitor elements in the plurality of capacitor elements. The conductive material may electrically connect and integrate the cathode parts of the plurality of overlapped capacitor elements with each other. The conductive material may be, for example, a paste containing metal or a film containing metal.

(Anode Terminal)

The anode terminal is connected to the anode parts of the capacitor elements. The anode terminal may be made of, for example, copper or copper alloy. The anode terminal is formed by, for example, punching a metal foil to form a metal frame having a predetermined shape and bending the metal frame.

(Cathode Terminal)

The cathode terminal is connected to the cathode parts of the capacitor elements via a conductive paste. The cathode terminal may be made of, for example, copper or copper alloy. The cathode terminal has facing surface S1 facing a tip end of the element stack with gap G therebetween. At least a part of gap G is filled with a sealing material.

(Sealing Material)

The sealing material contains a resin material as an essential component and a filler as an optional component. As the filler, ceramic particles such as inorganic oxides are preferably used. The sealing material is less likely to transmit air than the conductive material and the conductive paste. At least a part of the conductive material and the conductive paste is covered with the sealing material by filling at least a part of gap G with the sealing material, and thus external air hardly reaches the capacitor elements. Air moves along the interface where the cathode terminal and the exterior member are peeled from each other. Such peeling occurs, for example, when a circuit member including the solid electrolytic capacitor is heated in reflow or the like, then moisture present inside or around the capacitor element vaporizes, and the volume of the exterior member expands. On the other hand, when gap G is filled with the sealing material, air is inhibited from reaching the capacitor elements unless the cathode terminal and the sealing material are peeled from each other. Even when the cathode terminal and the sealing material are peeled from each other, an interface between the cathode terminal and the sealing material is added to a path through which air reaches the capacitor elements, and thus a path of air from the outside to the capacitor element lengthens. Airtightness of the solid electrolytic capacitor can be improved in this manner.

The sealing material may contain a curing catalyst in a content proportion of less than or equal to 1 mass %. As the curing catalyst, two types of a phosphorus-based curing catalyst and a nitrogen-based curing catalyst may be contained. The content proportion of the nitrogen-based curing catalyst may be smaller than the content proportion of the phosphorus-based curing catalyst. As the curing catalyst, only one type of phosphorus-based curing catalyst may be contained. The curing catalyst may have latent properties.

The sealing material containing the curing catalyst can keep its viscosity during molding low for a certain period of time and can improve the adhesion between the cathode terminal and the sealing material to prevent peeling. This configuration can further improve the airtightness of the solid electrolytic capacitor.

In the present specification, the term "tip end of the element stack" refers to the end of the element stack at a cathode side. Specifically, the element stack has two ends, one end at an anode side and one end at the cathode side. In the present specification, the term "tip end" refers to the latter.

(Exterior Member)

The exterior member covers the element stack, the anode terminal, and the cathode terminal in a state where a part of each of the anode terminal and the cathode terminal is exposed. The exterior member may be made of resin material or may contain a filler. Ceramic particles such as inorganic oxide are preferably used also as the filler of the exterior member. For example, the composition of the exterior member may be the same as the composition of the sealing material to be filled in the gap.

A part of the exterior member may constitute the sealing material. In this case, the exterior member and the sealing material are preferably integrally formed of the same molding material. As the molding material, a thermosetting resin composition containing a resin component and a filler is preferably used. The resin component contains a main agent and a curing agent. By integrally forming the exterior member and the sealing material, the solid electrolytic capacitor of the present disclosure can be easily manufactured, and the manufacturing cost can be held down. When the exterior member and the sealing material are integrated in a finished product of the solid electrolytic capacitor, the sealing material is regarded as a part of the exterior member even when the exterior member and the sealing material are made of different constituent materials.

It is not necessary that a part of the exterior member constitutes the sealing material. In other words, the sealing material may be configured separately from the exterior member. This makes it possible to appropriately select the material of the sealing material to be filled in the gap.

Hereinafter, gap G between the cathode terminal and the tip end of the element stack is considered as being defined into gap (a) (hereinafter, also referred to as gap A) between the cathode terminal and a capacitor element (hereinafter, the capacitor element may be referred to as a connection-side capacitor element) closest to a connection part of the cathode terminal, which connects to the element stack, and gap (b) (hereinafter, also referred to as gap B) between the cathode terminal and all the capacitor elements except the connection-side capacitor element.

The conductive paste does not have to be present in the gap (gap B) between facing surface S1 of the cathode terminal and all the capacitor elements except the connection-side capacitor element. The conductive paste has a strength lower than that of the sealing material and is likely to let air pass. Thus, it is desirable that gap B is filled with the sealing material and with no conductive paste. This forms a long distance of the joint between the cathode terminal and the resin material, and thus a path through which air reaches the capacitor elements from the outside is hardly formed, and the airtightness of the solid electrolytic capacitor is further improved. When gap B is filled with the sealing material and with no conductive paste, slight void V may be formed between the sealing material and the conductive paste. Such void V may be formed in gap A into which the conductive paste may enter. However, void V is sufficiently small, and thus it does not significantly affect the airtightness of the solid electrolytic capacitor. The area of void V in a section of gap G between the tip end of the element stack and facing surface S1 in facing direction D2 may be, for example, less than or equal to 16,000 $\mu m^2$.

A dimension of gap G between the tip end of the element stack and facing surface S1 in facing direction D2 is preferably more than or equal to 40 $\mu m$. The dimension of gap G is more preferably more than or equal to 60 $\mu m$. With gap G having a dimension of more than or equal to 40 $\mu m$, the strength of the sealing material is maintained, cracks are less likely to be formed, and thus the airtightness of the solid electrolytic capacitor can be secured.

The conductive material does not have to be in contact with facing surface S1 in gap B between facing surface S1 of the cathode terminal and all the capacitor elements except the connection-side capacitor element. The conductive material has a strength lower than that of the sealing material and is likely to let air pass. When the conductive material and the cathode terminal contact each other in gap B, air may reach the capacitor elements via the conductive material. Thus, it is desirable that the conductive material and facing surface S1 of the cathode terminal do not contact each other in gap B.

The sealing material may fill at least gap B between facing surface S1 of the cathode terminal and all the capacitor elements except the connection-side capacitor element, and may also fill at least a part of gap A. In such a case, the sealing material is desirably filled in gap B to be continuously present along stacking direction D1 of the plurality of capacitor elements. This prevents to a high degree the conductive material and facing surface S1 of the cathode terminal from contacting each other in gap B. It is desirable that the sealing material is continuously filled in gap B along facing surface S1 to contact facing surface S1. This forms a sufficiently long distance of the joint between the cathode terminal and the exterior member, and thus the airtightness of the solid electrolytic capacitor further improves.

The conductive paste may also be present in gap A between the connection-side capacitor element and facing surface S1 of the cathode terminal. In this case, it is preferable that the entire part of gap G where the conductive paste is not present is filled with the sealing material. However, slight void V may be formed between the sealing material and the conductive paste, and even in such a case, it is defined that the entire part of gap G where the conductive paste is not present is filled with the sealing material.

Facing surface S1 of the cathode terminal may be inclined with respect to stacking direction D1 to increase gap G upward from the connection part of the cathode terminal connecting to the element stack. The angle formed by facing surface S1 of the cathode terminal and stacking direction D1 of the plurality of capacitor elements may be in a range from 0° to 30°, inclusive. When the angle formed by facing surface S1 of the cathode terminal and stacking direction D1 is larger than 30°, the volume occupied by the cathode terminal in the solid electrolytic capacitor increases. Thus, when the size of the entire solid electrolytic capacitor is not changed, it is necessary to reduce the element stack (each capacitor element) in size, and the capacitance of the solid electrolytic capacitor decreases, which is not preferable.

With facing surface S1 of the cathode terminal being inclined with respect to stacking direction D1 of the plurality of capacitor elements, it is possible to prevent the tip end of the element stack from contacting facing surface S1 of the cathode terminal when the capacitor elements are being stacked from the connection part with the cathode terminal. This can always form a gap between the tip end of the element stack and the cathode terminal, and thus can further increase the airtightness of the solid electrolytic capacitor. The filling property of the sealing material into gap G can also increase.

In any of the above aspects, the connection-side capacitor element closest to the connection part of the cathode terminal, which connects to the element stack, is preferably a capacitor element farthest from the part where the cathode terminal is exposed from the exterior member. This can make the path of air from the exposed part to the capacitor elements as long as possible and can further increase the airtightness of the solid electrolytic capacitor.

The entire gap G (that is, both gap A and gap B) may be filled with the sealing material. This can make the path of air from the part where the cathode terminal is exposed from the exterior member to the capacitor elements longer and can further increase the airtightness of the solid electrolytic capacitor.

When the sealing material contains a filler, the dimension of gap G between the tip end of the element stack and facing surface S1 in facing direction D2 may be larger than the maximum size of the filler. By this configuration, a sufficient amount of filler is likely to enter gap G, and the strength of the sealing material present in gap G can increase. Thus, the sealing material is less likely to crack in facing direction D2, and a bypass passage of air is less likely to form. Further, the shrinkage rate of the sealing material in which the filler has entered gap G decreases, and peeling between the sealing material and the cathode terminal is prevented. Thus, it is possible to further increase the airtightness of the solid electrolytic capacitor. It is desirable that the filler is filled in the entire gap B. That is, when a straight line is drawn along facing direction D2, it is desirable that the straight line cannot be drawn without crossing the filler particles.

Here, the term "maximum size of the filler" refers to the particle diameter of the largest particle among the particles of the filler contained in the sealing material. For example, when the particle diameter of the filler contained in the sealing material is in a range from 5 μm to 60 μm, inclusive, the maximum size of the filler is 60 μm. The maximum size of the filler is determined as the maximum value of the diameter of an equivalent circle having the same area as the area of any 100 particles selected by photographing a section of the sealing material. The maximum size of the filler may be, for example, less than or equal to 100 μm, or less than or equal to 60 μm.

The dimension of gap G in facing direction D2 may be larger than 1.5 times the maximum size of the filler. For example, when the maximum size of the filler is 60 μm, the dimension of gap G may be larger than 90 μm. With this dimension, the filler is further likely to enter gap G, and the airtightness of the solid electrolytic capacitor can further increase. The dimension of gap G in facing direction D2 may be measured at the center height of facing surface S1 of the cathode terminal in stacking direction D1 with respect to the connection part of the cathode terminal with the element stack. The upper limit of the dimension of gap G in facing direction D2 is desirably, for example, 1/10 of the length of the capacitor elements in facing direction D2 from the viewpoint of downsizing the solid electrolytic capacitor.

The sealing material may be a cured product of a composition containing a main agent and a curing agent. The main agent and the curing agent are both included in a resin component. For example, a thermosetting resin composition is suitable as a molding material of the sealing material or the exterior member. Typical examples of the main component of the thermosetting resin composition include an epoxy resin. Typical examples of the curing agent for the thermosetting resin composition include a polyamine, a phenol resin, and an acid anhydride.

The main agent may contain a first component having a biphenyl skeleton. Examples of the first component include a biphenyl epoxy resin and a biphenyl aralkyl epoxy resin. Among them, a biphenyl aralkyl epoxy resin is preferable. The first component contributes to lowering the viscosity of the molding material forming the sealing material or the exterior member, and it has low water absorbency or hygroscopicity, a small molding shrinkage rate, and excellent adhesion to metal. That is, moisture is less likely to remain inside or around the capacitor element, volume expansion of the exterior member during reflow is likely to be reduced, and peeling between the cathode terminal and the sealing material is inherently less likely to occur.

The biphenyl aralkyl epoxy resin has a biphenyl skeleton and a plurality of glycidyl ether groups in the molecule. The biphenyl aralkyl epoxy resin may be a phenol biphenylene resin in which a phenolic hydroxyl group is substituted with a glycidyl ether group.

The main agent of the sealing material may further contain a second component other than the first component. The second component may be an epoxy resin having no biphenyl skeleton. This makes it possible to impart, with the second component, physical properties of the sealing material and the molding material that are not achieved only with the first component. Thus, the physical property balance of the sealing material and the molding material can be freely controlled. As the second component, a bisphenol A epoxy resin, a bisphenol F epoxy resin, a bisphenol AD epoxy resin, a hydrogenated bisphenol A epoxy resin, a phenol novolac epoxy resin, a cresol novolac epoxy resin, an alicyclic aliphatic epoxy resin, a dicyclopentadiene epoxy resin, or the like may be used. These resins may be used alone or in combination of two or more thereof.

The proportion of the first component in the main agent may be more than 50 mass %. For example, in a thermosetting resin composition in which the first component is a biphenyl aralkyl epoxy resin, the proportion of the biphenyl aralkyl epoxy resin to all the epoxy resins (that is, the sum of the first component and the second component) is larger than the total proportion of all the epoxy resins other than the biphenyl epoxy resin (that is, the second component). This increases the merit of the first component, further increases the adhesion strength between facing surface S1 and the sealing material, and can further increase the airtightness of the solid electrolytic capacitor.

The molding shrinkage rate of the sealing material may be less than or equal to 0.5%. Here, the molding shrinkage rate of the sealing material is measured according to JIS K 6911. This makes it easy to reduce the stress generated at the interface between facing surface S1 and the sealing material, and the airtightness of the solid electrolytic capacitor can further increase.

When the sealing material contains a filler, the content proportion of the filler in the sealing material may be in a range from 80 mass % to 92 mass %, inclusive. With this proportion, it is possible to realize various properties of the resin such as low viscosity, low water absorption, low stress, and high adhesion in a well-balanced manner. The filler is preferably ceramic particles, and the ceramic particles are preferably an inorganic oxide or inorganic nitride. As the inorganic oxide, silica, alumina, titania, magnesium oxide, zinc oxide, or the like may be used, but the inorganic oxide is not limited to these oxides. As the inorganic nitride, boron nitride, silicon nitride, aluminum nitride, or the like may be used, but the inorganic nitride is not limited to these nitrides.

Hereinafter, an example of the solid electrolytic capacitor according to the present disclosure will be specifically described with reference to the drawings. The above-described constituent elements may be applied to constituent elements of the solid electrolytic capacitor as an example described below. The constituent elements of the solid electrolytic capacitor as an example described below may be changed based on the above-described description. The matters described below may be applied to the exemplary embodiment described above. Among the constituent elements of the solid electrolytic capacitor as an example described below, constituent elements that are not essential to the solid electrolytic capacitor according to the present disclosure may be omitted. The drawings presented below are schematic and do not accurately reflect the shape or number of actual members.

As illustrated in FIG. 1, solid electrolytic capacitor 10 includes element stack 20, anode terminal 60, cathode terminal 70, and exterior member 80.

(Element Stack)

Figure 2:
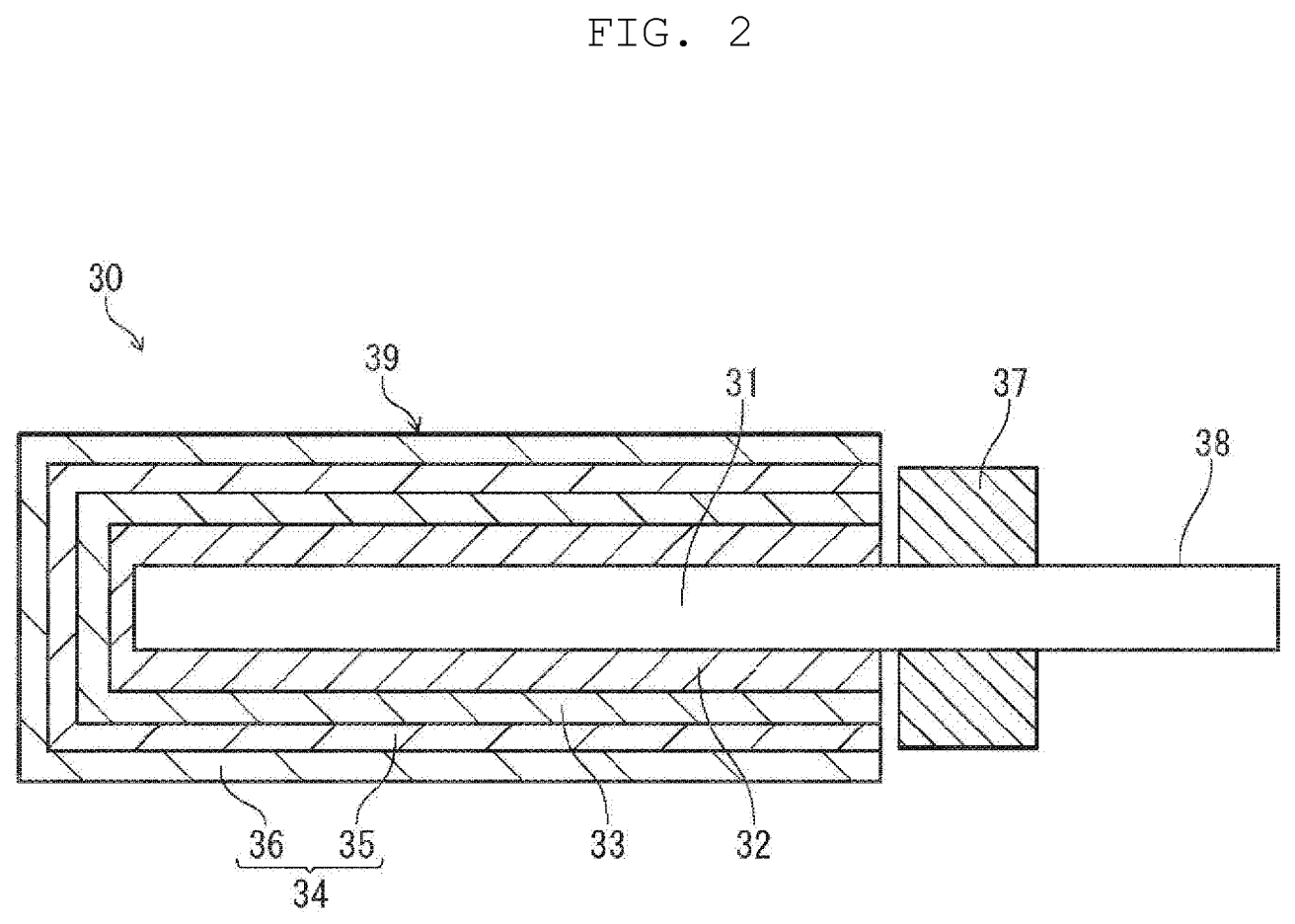

Element stack 20 is a stack of a plurality of (in this example, five) capacitor elements 30. The plurality of capacitor elements 30 are stacked in a vertical direction (stacking direction D1) in FIG. 1. As illustrated in FIG. 2, each capacitor element 30 includes anode body 31, dielectric layer 32, solid electrolyte layer 33, and cathode layer 34.

Anode body 31 is a foil made of valve metal of aluminum, and a part thereof (a part on the right side in FIG. 1 or 2) serves as anode part 38. Anode parts 38 of capacitor elements 30 are joined to each other.

Dielectric layer 32 is made of aluminum oxide formed on the surface of anode body 31 on a side separated from anode part 38 by insulator layer 37 (that is, in FIG. 2, the part on the left of the insulator layer 37) by a gas phase method such as anodic oxidation or vapor deposition.

The valve metal of the present exemplary embodiment is aluminum, but it may be a valve metal such as tantalum, niobium, or titanium. Anode body 31 is a foil of a valve metal, but it may be a porous sintered body made of powder of a valve metal.

Solid electrolyte layer 33 is formed on the surface of dielectric layer 32. Solid electrolyte layer 33 contains a conductive polymer. Solid electrolyte layer 33 may further contain a dopant, an additive agent, and the like as necessary.

As the conductive polymer, a known polymer used for a solid electrolytic capacitor, such as a π-conjugated conductive polymer, may be used. Examples of the conductive polymer include polymers having polypyrrole, polythiophene, polyaniline, polyfuran, polyacetylene, polyphenylene, polyphenylene vinylene, polyacene, and polythiophene vinylene as a basic skeleton. Among these polymers, a polymer that adopts polypyrrole, polythiophene, or polyaniline as a basic skeleton is preferable. The above-mentioned polymers also include a homopolymer, a copolymer of two or more types of monomers, and derivatives of these polymers (a substitute having a substituent group). For example, polythiophene includes poly(3,4-ethylenedioxythiophene) and the like. As the conductive polymer, one type may be used alone, or two or more types may be used in combination.

As the dopant, at least one selected from the group consisting of anions and polyanions is used, for example. Examples of the anion include, but are not particularly limited to, a sulfate ion, a nitrate ion, a phosphate ion, a borate ion, an organic sulfonate ion, and a carboxylate ion. Examples of the dopant that generates sulfonate ions include benzenesulfonic acid, p-toluenesulfonic acid, and naphthalenesulfonic acid. Examples of the polyanion include a polymer-type polysulfonic acid and a polymer-type polycarboxylic acid. Examples of the polymer-type polysulfonic acid include a polyvinylsulfonic acid, a polystyrenesulfonic acid, a polyallylsulfonic acid, a polyacrylsulfonic acid, and a polymethacrylsulfonic acid. Examples of the polymer-type polycarboxylic acid include a polyacrylic acid and a polymethacrylic acid. The polyanion also includes a polyester sulfonic acid and a phenolsulfonic acid novolak resin. However, the polyanion is not limited to them.

Solid electrolyte layer 33 may further contain a known additive agent and a known conductive material other than the conductive polymer as necessary. Examples of such a conductive material include at least one selected from the group consisting of conductive inorganic materials such as manganese dioxide and TCNQ complex salts.

Cathode layer 34 includes carbon layer 35 formed on the surface of solid electrolyte layer 33 and conductor layer 36 formed on the surface of carbon layer 35. Conductor layer 36 may be made of silver paste. As the silver paste, a composition containing silver particles and a resin component (binder resin) may be used, for example. As the resin component, a thermoplastic resin may be used, but it is preferable to use a thermosetting resin such as an imide resin or an epoxy resin.

A part of each capacitor element 30 (the part on the left of insulator layer 37 in FIG. 1 or 2) is cathode part 39. Cathode part 39 includes components ranging from anode body 31 to cathode layer 34.

As illustrated in FIG. 1, element stack 20 further includes conductive material 40 disposed on cathode part 39 and interposed between two adjacent capacitor elements in the plurality of capacitor elements 30. Conductive material 40 is made of, for example, silver paste. Conductive material 40 is interposed between two adjacent cathode parts 39 in the plurality of cathode parts 39 and electrically connects them. As the silver paste constituting conductive material 40, for example, a composition containing silver particles and a resin component (binder resin) may be used. The composition of the silver paste constituting conductive material 40 may be the same as or different from the silver paste constituting conductor layer 36.

(Anode Terminal)

Anode terminal 60 is connected to anode part 38 of lowermost capacitor element 30 in FIG. 1. This causes anode terminal 60 to be electrically connected to anode parts 38 of the plurality of capacitor elements 30. Anode terminal 60 is made of, for example, copper, iron, copper alloy, or iron alloy. A part of anode terminal 60 including a connecting part with anode part 38 is covered with exterior member 80, and the rest of anode terminal 60 is exposed from exterior member 80.

(Cathode Terminal)

Cathode terminal 70 is connected to cathode part 39 of lowermost capacitor element 30 in FIG. 1 via conductive paste 50 made of, for example, silver paste. This causes cathode terminal 70 to be electrically connected to cathode parts 39 of the plurality of capacitor elements 30. As the silver paste constituting conductive paste 50, for example, a composition containing silver particles and a resin component (binder resin) may be used. The composition of the silver paste constituting conductive paste 50 may be the same as or different from the silver paste constituting conductor layer 36 or conductive material 40. Cathode terminal 70 is made of, for example, copper, iron, copper alloy, or iron alloy. A part of cathode terminal 70 including a connecting part with cathode part 39 is covered with exterior member 80, and the rest of cathode terminal 70 is exposed from exterior member 80.

Cathode terminal 70 has facing surface S1 facing tip end 20a of element stack 20 with gap G therebetween. The dimension of gap G between tip end 20a of the element stack 20 and facing surface S1 in facing direction D2 (left-right direction in FIG. 1) is, for example, about 100 μm, and is larger than the maximum size of the filler to be described later.

Figure 3:
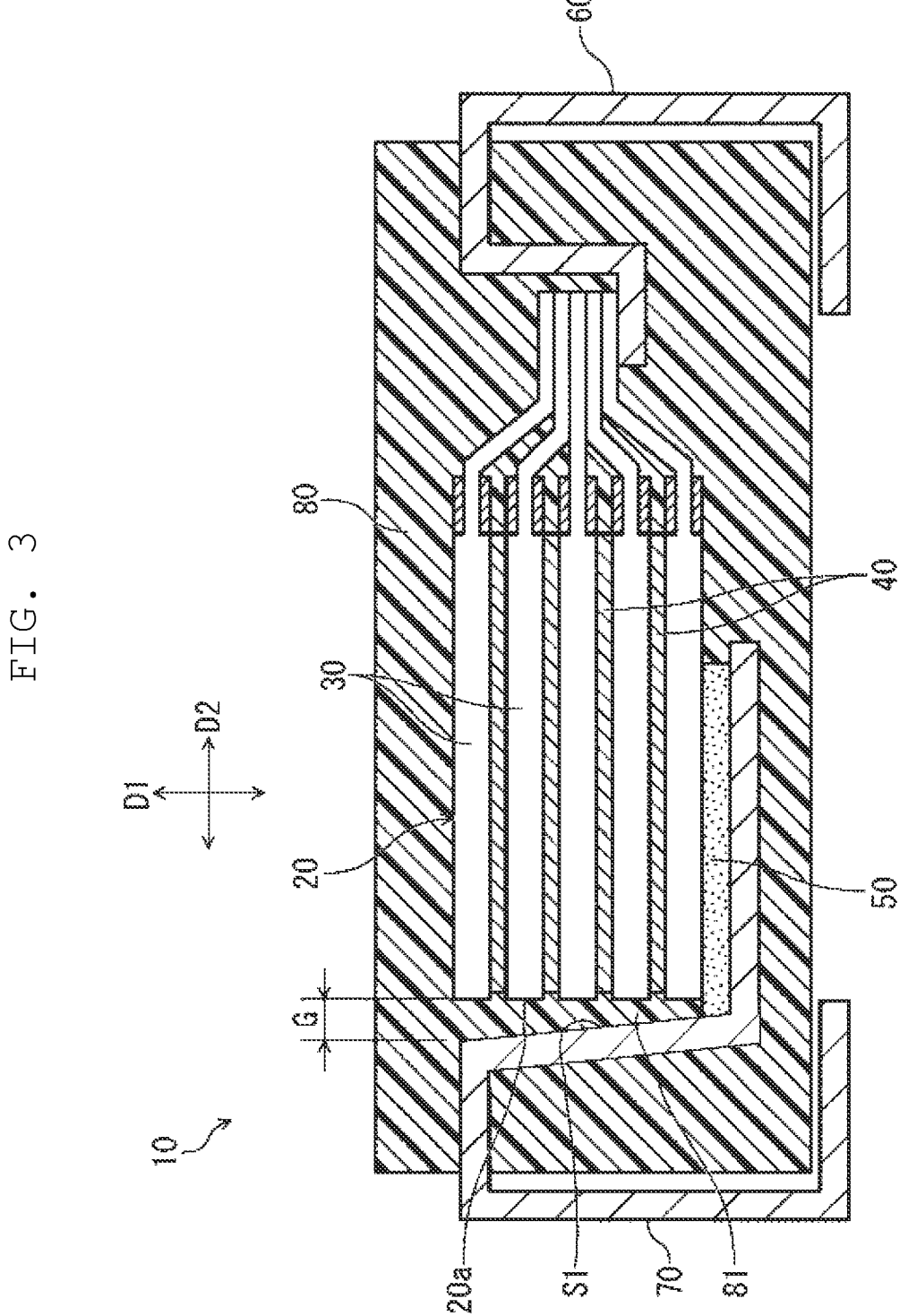
FIG. 3 is a sectional view illustrating another configuration of the solid electrolytic capacitor according to the present disclosure.

In FIG. 1, facing surface S1 of cathode terminal 70 is disposed to have gap G between tip end 20a of element stack 20, the gap having a constant value along stacking direction D1 of the plurality of capacitor elements. However, as illustrated in FIG. 3, facing surface S1 of cathode terminal 70 may be inclined with respect to stacking direction D1 to have gap G increasing upward from a connection part of cathode terminal 70 connecting to element stack 20. In such a case, the angle formed by facing surface S1 of cathode terminal 70 and stacking direction D1 of the plurality of capacitor elements may be in a range from 0° to 30°, inclusive.

(Exterior Member)

Exterior member 80 covers element stack 20, anode terminal 60, and cathode terminal 70 in a state where a part of each of anode terminal 60 and cathode terminal 70 is exposed. Exterior member 80 is a cured product of a thermosetting resin composition containing a main agent and a curing agent. The main agent contains a first component (in this example, a biphenyl aralkyl epoxy resin) having a biphenyl skeleton. The molding shrinkage rate of the exterior member 80 is preferably less than or equal to 0.5%.

Exterior member 80 preferably contains a filler in a content proportion in a range from 80 mass % to 92 mass %, inclusive. The maximum size of the filler is, for example, about 60 μm, but it may be smaller or larger.

A part of exterior member 80 (the part indicated by reference numeral 81 in FIG. 1) is filled in gap G between tip end 20a of element stack 20 and facing surface S1 of cathode terminal 70. The entire gap G is preferably filled with a part of exterior member 80 as the sealing material.

This example is an example of a case where a part of exterior member 80 serves as the sealing material.

Figure 4:
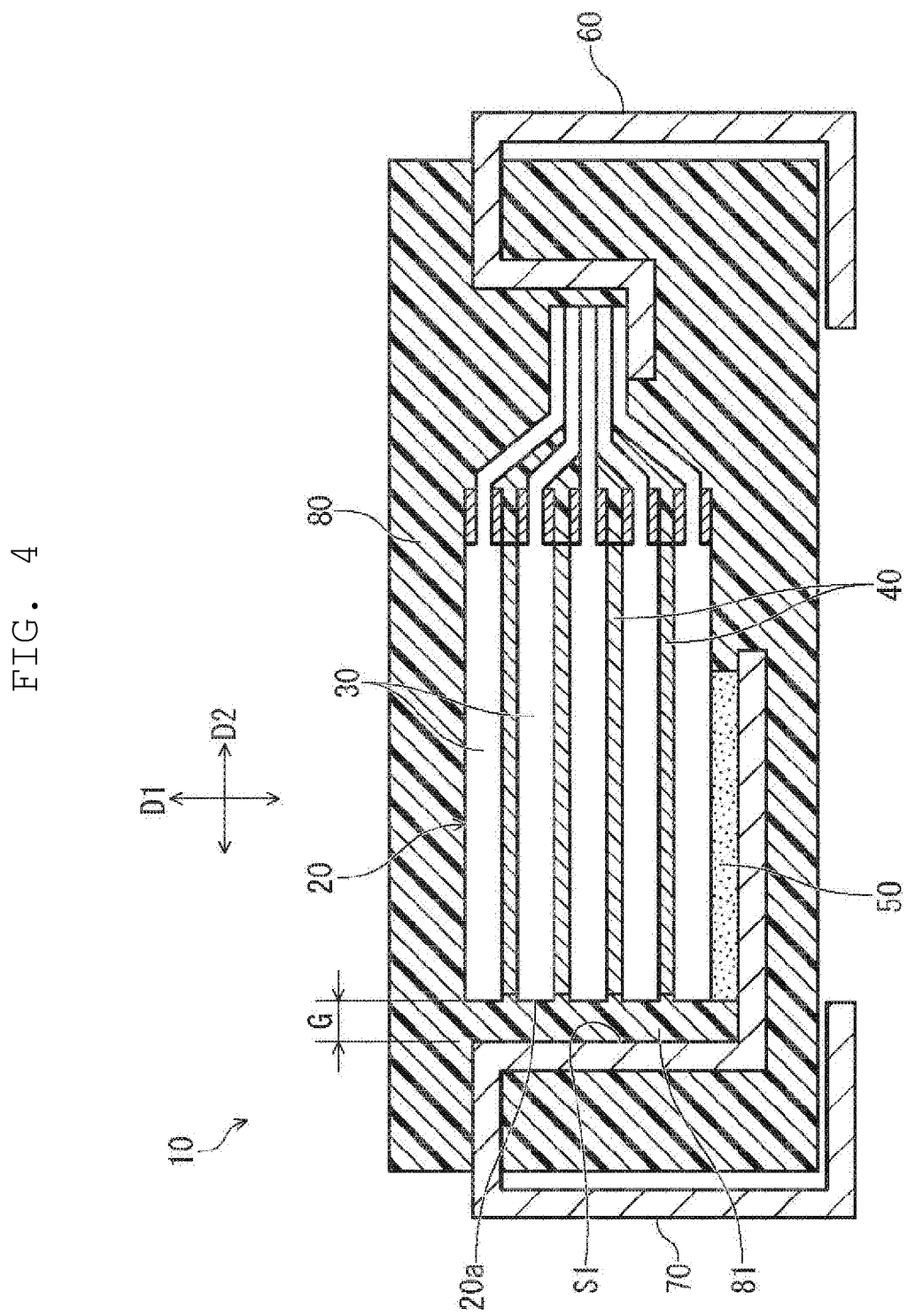
FIG. 4 is a sectional view illustrating still another configuration of the solid electrolytic capacitor according to the present disclosure.

As illustrated in FIG. 4, conductive paste 50 does not have to be in contact with facing surface S1 of cathode terminal 70. In such a case, the region between facing surface S1 and conductive paste 50 is also filled with a part of exterior member 80 as the sealing material.

At least a part of gap G is filled with a part of exterior member 80. For example, gap G may be filled with a part of exterior member 80 between facing surface S1 of cathode terminal 70 and all capacitor elements 30 except lowermost capacitor element 30 (connection-side capacitor element) in FIG. 1.

Conductive paste 50 is not present in the region of gap G where a part of exterior member 80 is filled. In the same region of gap G, conductive material 40 is not in contact with facing surface S1 of cathode terminal 70.

Exterior member 80 is formed integrally with sealing material 81 by, for example, introducing a molding material into a mold in which element stack 20 is disposed by a transfer molding method, but the method for forming exterior member 80 is not limited to this method.

EXAMPLES

For the configuration of the solid electrolytic capacitor (in which six capacitor elements are stacked) of the present exemplary embodiment illustrated in FIG. 4, gap G between tip end 20a of element stack 20 and facing surface S1 of cathode terminal 70 was changed to form solid electrolytic capacitors of Examples and Comparative Example, and for these solid electrolytic capacitors, the rate of change of ESR (ΔESR) before and after a reliability test was measured to evaluate airtightness, as shown in the following Table 1. For each of the solid electrolytic capacitors of Examples and Comparative Example, the initial ESR was measured, then a reliability test was performed in which the solid electrolytic capacitor was held in an atmosphere at 125° C. for 3,000 hours, and the ESR after the reliability test was measured. ΔESR indicating the rate of change of ESR was determined by the following formula.

ΔESR (%)=((ESR after reliability test)−(initial ESR))/(initial ESR)×100

Table 1 shows results of Examples and Comparative Example. Here, the evaluation of airtightness is determined by the magnitude of ΔESR, and "VG" indicates very good, "OK" indicates good, "NB" indicates acceptable, and "NG" indicates defective.

TABLE 1

| | Gap G (μm) | ΔESR (%) | Airtightness |
|---|---|---|---|
| Example 1 | 19 | 2968 | [[Δ]]NB |
| Example 2 | 28 | 632 | [[Δ]]NB |
| Example 3 | 40 | 289 | [[○]]OK |
| Example 4 | 50 | 125 | [[○]]OK |
| Example 5 | 60 | 68 | [[◎]]VG |
| Example 6 | 72 | 47 | [[◎]]VG |
| Comparative Example 1 | 0 | 17917 | [[X]]NG |

As shown in Table 1, in Examples 1 to 6 in which gap G between tip end 20a of element stack 20 and facing surface S1 of cathode terminal 70 was provided and filled with the sealing material, the ΔESR was held down to less than or equal to ⅙ as compared with Comparative Example 1 in which gap G was 0 μm (this means that tip end 20a of element stack 20 and facing surface S1 of cathode terminal 70 are in contact with each other). This is considered to be because the improvement in airtightness of the solid electrolytic capacitor reduced deterioration of the capacitor elements due to external air. In particular, it is considered that in Examples 3 to 6 in which gap G was more than or equal to 40 µm, the airtightness of the solid electrolytic capacitor became higher, and thus the ΔESR was held down to less than or equal to $\frac{1}{60}$ as compared with Comparative Example 1. It is considered that in Examples 5 and 6 in which gap G was more than or equal to 60 µm, the airtightness of the solid electrolytic capacitor was further improved, and thus the ΔESR was held down to less than or equal to $\frac{1}{260}$ as compared with Comparative Example 1.

The present disclosure can be used for a solid electrolytic capacitor.

The invention claimed is:

1. A solid electrolytic capacitor comprising:
an element stack including a plurality of capacitor elements stacked on each other and a conductive material disposed between two adjacent capacitor elements in the plurality of capacitor elements, the plurality of capacitor elements including a first capacitor element and a second capacitor element, each of the first capacitor element and the second capacitor element including an anode part and a cathode part, the conductive material being disposed on the cathode part;
an anode terminal connected to the anode part;
a cathode terminal connected to the cathode part via a conductive paste; and
an exterior member that covers the element stack, the anode terminal, and the cathode terminal in a state where a part of each of the anode terminal and the cathode terminal is exposed, wherein:
the first capacitor element is closest to a connection part of the cathode terminal, the connection part connecting to the element stack,
the cathode terminal has a facing surface facing a tip end of the element stack with a gap between the facing surface and the tip end,
in a stacking direction of the plurality of capacitor elements, which is parallel to a normal direction of an upper surface of the connection part of the cathode terminal, a height of the facing surface from the upper surface of the connection part of the cathode terminal is greater than a height of an upper surface of the first capacitor element from the upper surface of the connection part of the cathode terminal,
at least a part of the gap is filled with a sealing material,
the sealing material is made of a same material as the exterior member and continuous from the exterior member,
the sealing material contains a filler, and
a dimension of gap in a facing direction between the tip end of the element stack and the facing surface is 1.5 times greater than a maximum size of the filler.

2. The solid electrolytic capacitor according to claim 1, wherein the conductive paste is not present in a region of the gap, the region being between the facing surface of the cathode terminal and all of the plurality of capacitor elements except the first capacitor element.

3. The solid electrolytic capacitor according to claim 1, wherein the conductive material is not in contact with the facing surface in a region of the gap, the region being between the facing surface of the cathode terminal and all of the plurality of capacitor elements except the first capacitor element.

4. The solid electrolytic capacitor according to claim 1, wherein the sealing material is filled in a region of the gap, the region being between the facing surface of the cathode terminal and all of the plurality of capacitor elements except the first capacitor element.

5. The solid electrolytic capacitor according to claim 1, wherein the sealing material is filled to be continuously present along the stacking direction of the plurality of capacitor elements.

6. The solid electrolytic capacitor according to claim 1, wherein the gap is entirely filled with the sealing material.

7. The solid electrolytic capacitor according to claim 1, wherein a dimension of the gap is more than or equal to 40 µm.

8. The solid electrolytic capacitor according to claim 1, wherein the facing surface of the cathode terminal is inclined with respect to the stacking direction so that a dimension of the gap in a direction parallel to the upper surface of the connection part of the cathode terminal between the facing surface of the cathode terminal and the tip end of the element stack is increased along the stacking direction from the connection part of the cathode terminal.

9. The solid electrolytic capacitor according to claim 8, wherein an angle formed by the facing surface and the stacking direction is less than or equal to 30 degrees.

10. The solid electrolytic capacitor according to claim 1, wherein:
the sealing material is a cured product of a composition containing a main agent and a curing agent, and
the main agent contains a first component having a biphenyl skeleton.

11. The solid electrolytic capacitor according to claim 10, wherein the first component is a biphenyl aralkyl epoxy resin.

12. The solid electrolytic capacitor according to claim 10, wherein the main agent further contains a second component other than the first component.

13. The solid electrolytic capacitor according to claim 12, wherein a proportion of the first component in the main agent is more than 50 mass %.

14. The solid electrolytic capacitor according to claim 1, wherein a molding shrinkage rate of the sealing material is less than or equal to 0.5%.

15. The solid electrolytic capacitor according to claim 1, wherein:
a content proportion of the filler in the sealing material is in a range from 80 mass % to 92 mass %, inclusive.

16. The solid electrolytic capacitor according to claim 1, wherein
the second capacitor element is stacked on the first capacitor element,
the anode part of the second capacitor element is stacked on the anode part of the first capacitor element in the stacking direction,
the anode terminal includes a connecting part which is connected to the anode part of the first capacitor element, and
the connecting part is covered with the exterior member.

17. The solid electrolytic capacitor according to claim 16, wherein
the connecting part of the anode terminal is connected to a lower surface of the anode part of the first capacitor element,
in the stacking direction, the height of the facing surface from the upper surface of the connection part of the cathode terminal is greater than a height of the lower surface of the anode part of the first capacitor element from the upper surface of the connection part of the cathode terminal.

18. A solid electrolytic capacitor comprising:

an element stack including a plurality of capacitor elements stacked on each other and a conductive material disposed between two adjacent capacitor elements in the plurality of capacitor elements, the plurality of capacitor elements including a first capacitor element and a second capacitor element, each of the first capacitor element and the second capacitor element including an anode part and a cathode part, the conductive material being disposed on the cathode part;

an anode terminal connected to the anode part;

a cathode terminal connected to the cathode part via a conductive paste; and an exterior member that covers the element stack, the anode terminal, and the cathode terminal in a state where a part of each of the anode terminal and the cathode terminal is exposed, wherein:

the first capacitor element is closest to a connection part of the cathode terminal, the connection part connecting to the element stack, the cathode terminal has a facing surface facing a tip end of the element stack with a gap between the facing surface and the tip end, in a stacking direction of the plurality of capacitor elements, which is parallel to a normal direction of an upper surface of the connection part of the cathode terminal, a height of the facing surface from the upper surface of the connection part of the cathode terminal is greater than a height of an upper surface of the first capacitor element from the upper surface of the connection part of the cathode terminal, the facing surface of the cathode terminal is inclined with respect to the stacking direction so that a dimension of the gap in a direction parallel to the upper surface of the connection part of the cathode terminal between the facing surface of the cathode terminal and the tip end of the element stack is increased along the stacking direction from the connection part of the cathode terminal, an angle formed by the facing surface and the stacking direction is less than or equal to 30 degrees, at least a part of the gap is filled with a sealing material, and the sealing material is made of a same material as the exterior member and continuous from the exterior member.

* * * * *